(12) United States Patent
Grant

(10) Patent No.: US 10,761,998 B2
(45) Date of Patent: Sep. 1, 2020

(54) RECORDING SET INDICATOR

(71) Applicant: ARM LIMITED, Cambridge (GB)

(72) Inventor: Alasdair Grant, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/781,189

(22) PCT Filed: Nov. 23, 2016

(86) PCT No.: PCT/GB2016/053683
§ 371 (c)(1),
(2) Date: Jun. 4, 2018

(87) PCT Pub. No.: WO2017/125703
PCT Pub. Date: Jul. 27, 2017

(65) Prior Publication Data
US 2018/0357180 A1    Dec. 13, 2018

(30) Foreign Application Priority Data
Jan. 20, 2016 (GB) .................................. 1601037.3

(51) Int. Cl.
*G06F 12/1045* (2016.01)
*G06F 12/0895* (2016.01)
(Continued)

(52) U.S. Cl.
CPC ...... *G06F 12/1054* (2013.01); *G06F 12/0895* (2013.01); *G06F 12/1408* (2013.01);
(Continued)

(58) Field of Classification Search
CPC ............. G06F 12/1054; G06F 12/0895; G06F 12/1408; G06F 12/1475; G06F 12/14; G06F 2212/1052; G06F 21/78
See application file for complete search history.

(56) References Cited

U.S. PATENT DOCUMENTS

2003/0070045 A1   4/2003   Dwyer et al.
2006/0107024 A1   5/2006   Cypher
(Continued)

FOREIGN PATENT DOCUMENTS

EP      0 841 619      5/1998

OTHER PUBLICATIONS

International Search Report and Written Opinion of the ISA for PCT/GB2016/053683, dated Feb. 28, 2017, 11 pages.
(Continued)

*Primary Examiner* — Tracy A Warren
(74) *Attorney, Agent, or Firm* — Nixon & Vanderhye P.C.

(57) ABSTRACT

An apparatus comprises processing circuitry for accessing data in a physically-indexed cache. Set indicator recording circuitry is provided to record a set indicator corresponding to a target physical address, where the set indicator depends on which set of one or more storage locations of the cache corresponds to the target physical address. The set indicator is insufficient to identify the target physical address itself. This enables performance issues caused by contention of data items for individual sets in a physically-indexed set-associative or direct-mapped cache to be identified without needing to expose the physical address itself to potentially insecure processes or devices.

22 Claims, 6 Drawing Sheets

(51) Int. Cl.
*G06F 12/14* (2006.01)
*G06F 21/78* (2013.01)

(52) U.S. Cl.
CPC .......... *G06F 12/1475* (2013.01); *G06F 21/78* (2013.01); *G06F 2212/1052* (2013.01)

(56) References Cited

U.S. PATENT DOCUMENTS

| | | |
|---|---|---|
| 2008/0162818 A1 | 7/2008 | Okawa et al. |
| 2011/0047411 A1 | 2/2011 | Gille |
| 2011/0072212 A1* | 3/2011 | Kojima ............... G06F 12/0811 711/119 |
| 2013/0227221 A1 | 8/2013 | Yu |
| 2013/0332668 A1 | 12/2013 | Diep et al. |
| 2014/0082284 A1* | 3/2014 | Abella Ferrer ..... G06F 12/0864 711/119 |
| 2015/0149721 A1 | 5/2015 | Kannan et al. |

OTHER PUBLICATIONS

Combined Search and Examination Report for GB1601037.3, dated Jul. 6, 2016, 8 pages.

* cited by examiner

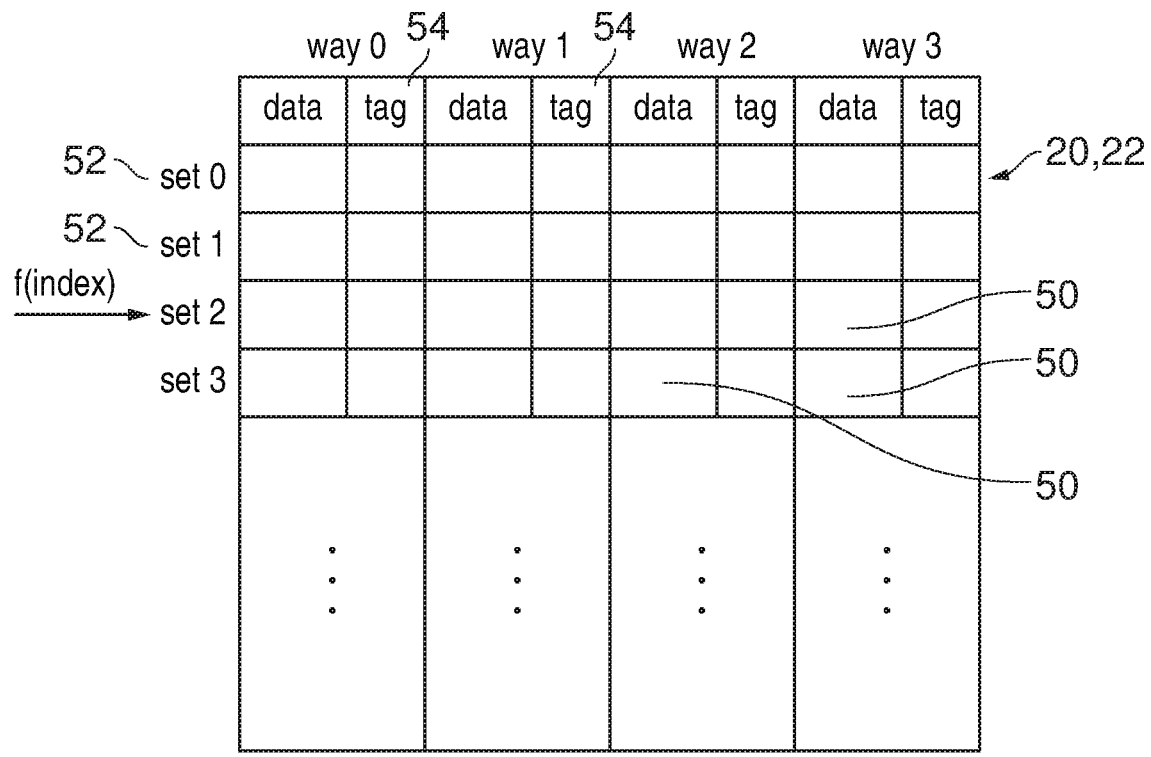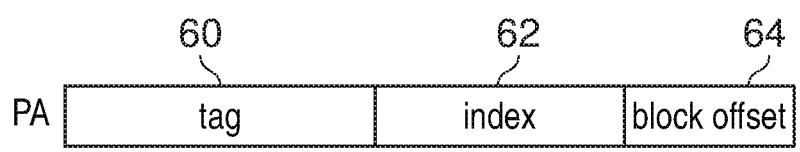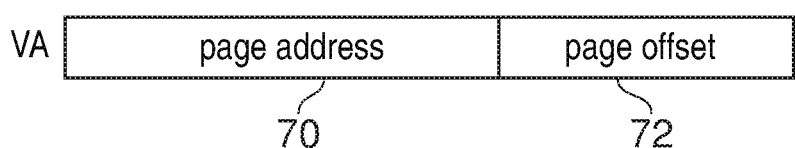
FIG. 2

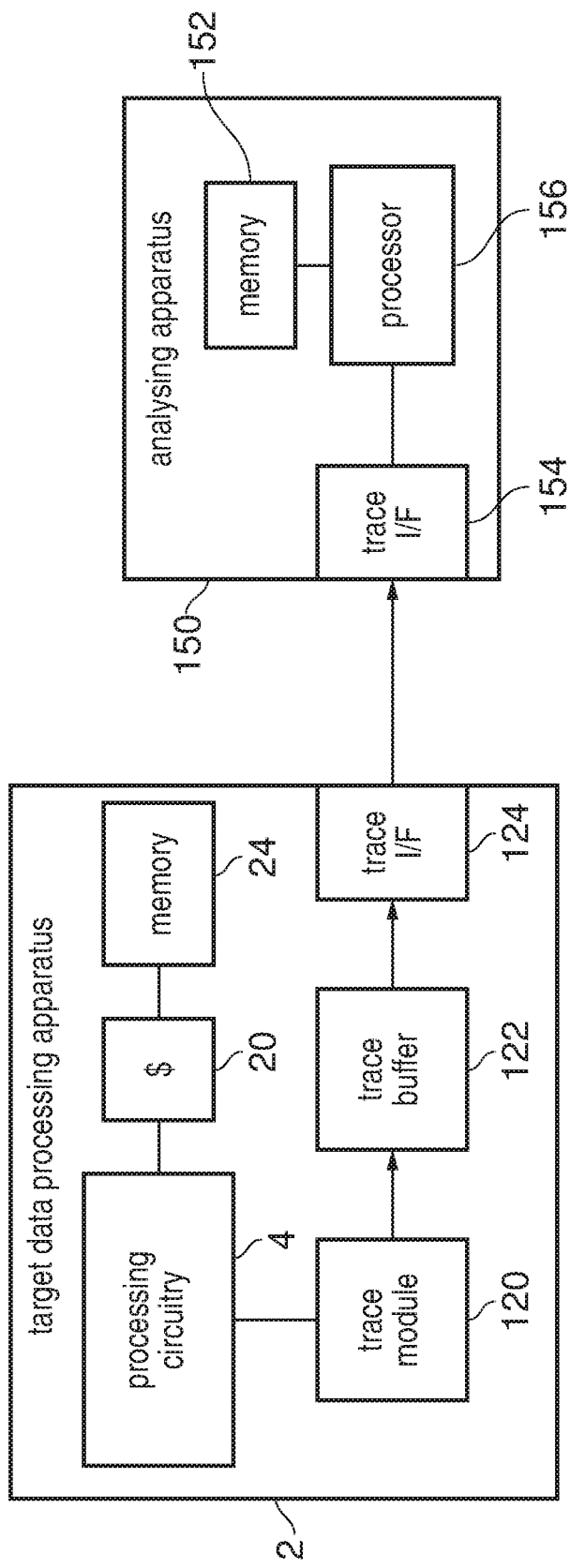

RECORDING SET INDICATOR

This application is the U.S. national phase of International Application No. PCT/GB2016/053683 filed Nov. 23, 2016, which designated the U.S. and claims priority to GB Patent Application No. 1601037.3 filed Jan. 20, 2016, the entire contents of each of which are hereby incorporated by reference.

The present technique relates to the field of data processing.

A data processing apparatus may use address translation when accessing data in memory, in which virtual addresses identified in response to program instructions being executed are translated into physical addresses identifying the data in the memory. This allows different software processes to coexist even if they specify overlapping ranges of virtual addresses, because the different software processes can have their addresses mapped to different portions of the physical address space.

A cache may be provided to speed up accesses to recently used data. In systems supporting virtual to physical address translation, the cache may be either virtually indexed or physically indexed. A virtually-indexed cache uses the virtual address to identify which storage locations of the cache could store required data, while a physically-indexed cache uses the physical address translated from the corresponding virtual address.

At least some examples provide an apparatus comprising:
processing circuitry configured to access data in a cache indexed by a physical address translated from a virtual address; and
set indicator recording circuitry configured to record a set indicator corresponding to a target physical address, wherein the set indicator is dependent on which of a plurality of sets of one or more storage locations of the cache corresponds to the target physical address, and the set indicator is insufficient to identify the target physical address.

At least some examples provide an apparatus comprising:
means for processing instructions and accessing data in a cache indexed by a physical address translated from a virtual address; and
means for recording a set indicator corresponding to a target physical address, wherein the set indicator is dependent on which of a plurality of sets of one or more storage locations of the cache corresponds to the target physical address, and the set indicator is insufficient to identify the target physical address.

At least some examples provide a data processing method comprising:
translating virtual addresses identified by processed instructions to physical addresses for accessing data in a physically-indexed cache; and
recording a set indicator corresponding to a target physical address, wherein the set indicator is dependent on which of a plurality of sets of one or more storage locations of the cache corresponds to the target physical address, and the set indicator is insufficient to identify the target physical address.

At least some examples provide a method comprising:
reading monitoring data captured during processing performed by processing circuitry configured to access data in a cache indexed by a physical address translated from a virtual address, the monitoring data comprising a plurality of set indicators corresponding to respective physical addresses, wherein each set indicator is dependent on which of a plurality of sets of one or more storage locations of the cache corresponds to the corresponding physical address, and is insufficient to identify the corresponding physical address; and
comparing respective set indicators to identify whether the corresponding physical addresses map to the same set of the cache.

At least some examples provide a computer program comprising instructions to control data processing apparatus to perform the method described above. A storage medium may store the computer program.

Further aspects, features and advantages of the present technique will be apparent from the following description of examples, which is to be read in conjunction with the accompanying drawings, in which:

FIG. 2 shows an example of a set-associative cache;

FIG. 6 shows an example of data processing apparatus having a trace module for capturing trace data regarding the real time operation of the processing circuitry;

FIG. 7 shows an example of a set indicator generating instruction;

Figure 1:
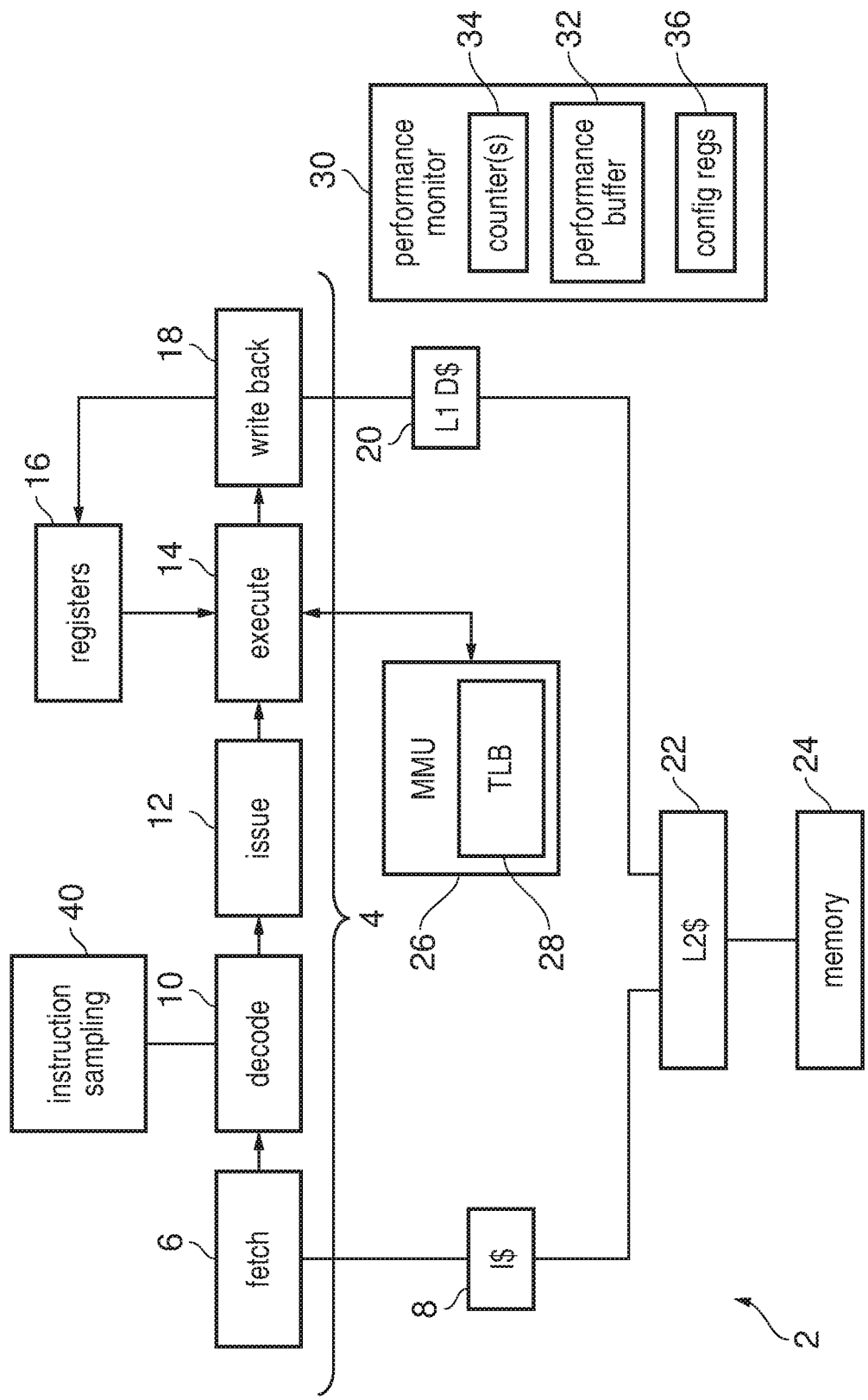
FIG. 1 illustrates an example of an apparatus having a cache and performance monitoring circuitry for capturing performance monitoring data.

Some specific examples will be described below. It will be appreciated that the invention is not limited to these exact examples.

The performance of a program executing on a data processing apparatus may be heavily influenced by how its memory accesses interact with the memory hierarchy, including any cache provided. Some caches restrict the possible storage locations at which data having a given address may be stored. The storage locations of the cache may be divided into a number of sets with each set comprising one or more storage locations. Each data item maps to a corresponding set and cannot be stored in locations other than those of the corresponding set. When all the locations in the corresponding set are occupied, further data accesses to addresses mapping to that set may cause evictions from the cache, and if the evicted data items need to be accessed again then this may reduce performance.

Hence, one factor influencing performance may be the contention of individual data items for individual sets. In a physically-indexed cache the corresponding set is identified by the data item's physical address, rather than its virtual address. Hence, when using a physically-indexed cache, the virtual addresses of the data items alone may not be enough to explain the real performance effects visible to application developers. One approach may be to record the physical addresses of different data accesses and make these available to a party investigating the performance of a given system, so that they can determine whether accesses map to the same set. However, often it may not be desirable to expose the physical addresses themselves to some software processes or to external devices. For example, an operating system designer may be unwilling to expose physical addresses to the application level, or a hypervisor may not wish to expose the physical addresses to an operating system running under it. Rowhammer type attacks have increased concerns around exposure of the physical layout of memory.

An apparatus having processing circuitry for accessing data in a physically-indexed cache may be provided with set indicator recording circuitry to record a set indicator corresponding to a target physical address, where the set indicator depends on which of a plurality of sets of one or more storage locations of the cache corresponds to the target physical address but is insufficient to identify the target physical address itself. Such a set indicator can be useful for analysing performance of software executed by the apparatus, by providing information for identifying set aliasing effects when accessing a physically-indexed cache, without exposing the system to security vulnerabilities by exposing the full physical address. By generating set indicators corresponding to a number of different physical addresses, the set indicators can be compared to identify whether the corresponding physical addresses map to the same set of the cache.

In some embodiments the apparatus may comprise address translation circuitry to translate the virtual addresses identified by instructions processed by the processing circuitry to physical addresses for accessing data in the cache. For example the address translation circuitry may be a memory management unit (MMU), which may include a translation lookaside buffer (TLB) for caching page table entries defining how to map virtual addresses to physical addresses. However, in other examples address translation may be performed in software by instructions executed by the processing circuitry itself, and in this case address translation circuitry provided in hardware may not be essential.

The set indicator recording circuitry may make the set indicator accessible to an external device or software process to which the target physical address is inaccessible. For example, the set indicator may be made available to application level software which would normally only see the virtual addresses, without risk of exposure of the corresponding physical address, or the set indicators could be output over an interface to an external device which could use them for analysing performance.

Nevertheless, the set indicator can also be useful for software processes or devices to which the physical address itself is accessible. As the set indicator may have fewer bits than the corresponding physical address, it may be more efficient in terms of storage capacity to record a set indicator even if the physical address is accessible.

The set indicator may be generated in various ways but in general it may depend on at least one index bit of the target physical address which is used for selecting which of the plurality of sets corresponds to that address.

In some cases the set indicator may fully identify which set of the cache corresponds to the target physical address. In this case, comparing the set indicators for two data accesses may be enough to determine whether or not those data accesses map to the same set.

However in other examples the set indicator may merely provide a partial identification of which of the sets corresponds to the target physical address. For example, address translation may be managed in units of addresses called pages, and the target physical address may comprise a page portion which is translated from a corresponding portion of a target virtual address and an offset portion which is mapped directly from a corresponding portion of the target virtual address. In this case the page portion identifies which page of the address space has been accessed and this portion may change between the virtual and physical addresses during the translation, but the offset portion simply identifies which address within a page is being selected and this may remain unchanged during the address translation. The index bits for selecting which set in the cache correspond to a given physical address may span both the page and offset portions. As the virtual address may already be available for analysing performance, some index bits within the offset portion which can already be determined from the virtual address may not need to be recorded in the set indicator. Hence, the set indicator could be determined based on one or more index bits which are within the page portion of the target physical address. By providing only the information for identifying the set which is not already available from the virtual address, the set indicator can be made smaller, reducing the storage overhead for storing set indicators.

The set indicator may correspond to any function of the target physical address which has the property that applying the function to two different physical addresses gives the same set indicator value if the two physical addresses map to the same set of the cache level of interest. For example in some cases the set indicator could simply be the index portion of the target physical address, or at least those bits of the index portion which cannot be inferred from the virtual address.

However, in some cases the set indicator may comprise a result of applying an obfuscation function to a subset of bits of the target physical address. This can make it harder for a software process or external device reading the set indicators to infer the actual physical address bits used for the index. For example, the obfuscation function could be an exclusive OR of the selected index bits with a constant, a substitution-box (S-box) function, a function which multiplies the relevant index bits by a prime number and takes a modulus, or any other function which obscures the true index bits in some way. The constant or other secret data (secret key) used to control the obfuscation function may be fixed in hardware or could be variable. The secret key can be accessible to the set indicator recording circuitry, but may be inaccessible to an external device or software process to which the target physical address is inaccessible. If a variable secret is used then it may be set by a physical-address-aware software process to which the target physical address is accessible.

In some cases the obfuscation function may be applied only to some bits of the target physical address, not all the bits (i.e. the subset of bits used is a proper subset). However, it would also be possible to apply the obfuscation function to the entire physical address (i.e. the subset of bits used is an improper subset). If the entire physical address is hashed using the obfuscation function, and the obfuscation function is a reversible function from which the physical address could be recovered if the secret data was known, then this can allow the process setting the secret data to selectively share the secret with certain other processors which are allowed to see the physical address itself so that more insight can be provided, while other processes may not be allowed the secret data so that the physical address cannot be inferred from the obscured set indicator. Hence, while in some cases the set indicator together with the secret data could be enough to identify the physical address itself, the set indicator alone is insufficient to identify the physical address.

Some systems may have multiple levels of physically-indexed cache. In some cases, the recorded set indicator may provide information for determining the set corresponding to a target physical address in one particular level of cache, regardless of which set maps to that physical address in other cache levels.

However, it may be useful to provide a set indicator for determining whether there is contention for a given set in multiple cache levels. Different cache levels may have different sizes or associativity, and so may use different sized portions of the physical address for indexing. To allow separate identification of the sets in multiple levels, the set indicator may include at least a first portion dependent on at least one index bit of the target physical address for selecting which set of one or more storage locations of a first level cache corresponds to the target physical address, and a second portion dependent on at least one index bit of the target physical address for selecting which set of one or more storage locations of a second level cache corresponds to the target physical address. If there are three or more levels of cache then there may also be further portions derived from index bits used for those levels of cache. In some cases, each portion of the set indicator may be derived from the entire index portion used in the corresponding level of cache. However, often the index portions used by the multiple cache levels may overlap to some extent, and so the respective portions of the set indicator may be derived from non-overlapping subsets of index bits of the target physical address, to avoid duplication of information. In this case, identifying the set associated with a given physical address in a particular level of cache may be based on two or more of the portions of the set indicator which are derived from respective non-overlapping subsets of index bits of the physical address which together form the index portion to be used for that level of cache.

In some cases, recording of the set indicator may be triggered by a cache access to a corresponding target physical address. The cache access could be triggered by a load operation, store operation, cache maintenance operation to invalidate or clean a storage location in the cache corresponding to a given physical address, a hardware prefetch operation to prefetch data into the cache without being triggered by any explicit request from the processing circuitry, or any other operation which results in the data having the target physical address being read, modified or allocated to the cache. Hence, when a cache access associated with a given physical address is triggered, the set indicator recording circuitry may record a set indicator corresponding to that physical address.

The set indicator could be generated at different points of a cache access. In some cases, the set indicator recording circuitry may sample some bits of the target physical address and generate the set indicator based on the sampled subset of bits. For example, the target physical address of a load/store operation could be sampled following address translation, before the physical address is provided to the cache. Which bits of the physical address are sampled for generating the set indicator could be fixed or could be configurable in software (e.g. by a physical-address-aware software process). This approach is useful for simple linear cache indexing schemes, where the index portion of the physical address directly identifies the corresponding set. By sampling the appropriate index bits and generating the set indicator outside the cache, existing cache circuits can be used without modification.

Alternatively, the set indicator could be generated based on information provided by the cache. When a cache access is made, the cache is provided with the physical address, and may return an index indicator indicating which set corresponds to the physical address. In some cases, the recorded set indicator may be identical to the received index indicator, so the set indicator recording circuitry simply records the value received from the cache. In other cases the set indicator recording circuitry could modify the index indicator in some way (e.g. by applying an obfuscation function) to generate the set indicator. This approach may be useful for caches which use a more complex cache indexing scheme, for example based on hashing arbitrary numbers of physical address bits.

The set indicator may be recorded in various ways, e.g. by writing it to a buffer or memory region, writing it to a register, or outputting the set indicator as part of a stream of diagnostic data.

In one example the set indicator recording circuitry may comprise performance monitoring circuitry for capturing performance monitoring data indicative of performance of the processing circuitry when processing instructions. For instructions triggering a cache access, the performance monitoring circuitry may record within the performance monitoring data the set indicator corresponding to the target physical address of the cache access. By recording set indicators for different cache accesses as part of the performance monitoring data, subsequent analysis of the performance monitoring data can compare the set indicators to identify whether contention for the same set in the cache is a possible reason for observed loss of performance. The generated performance monitoring data, including set indicators, may be recorded by writing it to a buffer or memory region from which the performance monitoring data can later be read to analyse the performance of the system. Since the software process which analyses the performance data may be relatively insecure and would not normally be exposed to physical addresses, providing performance monitoring circuitry with support for recording set indicators instead of physical addresses is useful for allowing cache set aliasing to be identified in a secure manner.

In some cases, the performance monitoring circuitry could record the set indicator for all cache accesses. However, this may be expensive in terms of storage overhead and power consumption, especially if the set indicator is not the only piece of performance monitoring data captured for each access. To limit the cost of performance monitoring, instruction sampling circuitry may select a subset of instructions for performance monitoring, and the performance monitoring circuitry may record the set indicator when one of the sampled subset of instructions triggers a cache access.

The performance monitoring circuitry need not always record set indicators. In some embodiments, the performance monitoring circuitry may be configurable to enable/disable recording of different types of performance monitoring data, e.g. based on data specified in a configuration register. In some cases, the configuration data may specify whether set indicators should be recorded for cache accesses. For example, the performance monitoring circuitry could support a mode in which the physical addresses of cache access themselves are recorded in the performance monitoring data, in addition to a mode in which the set indicators are recorded. One of these modes can be selected by a physical-address-aware layer depending on whether there is a perceived security risk associated with exposing the physical addresses. Also, if for a given run aliasing of data accesses onto the same set of the cache is not of interest for assessing performance, then recording of both the set indicator and the physical address could be disabled to save storage overhead. Hence, while the performance monitoring circuitry has a configuration to be able to record set indicators, it need not always do so.

In another example, the set indicator recording circuitry may comprise trace circuitry for generating a trace stream indicative of cycle-by-cycle behaviour of the processing circuitry. For example, the trace stream may identify which instructions are executed by the processor, or which data addresses are accessed, to enable subsequent analysis of the real time behaviour of the system when executing the program. The trace stream may be output to an external trace analysis device as the trace stream is being generated, or temporarily stored in a trace buffer on-chip before being read out by the external device later. The external device would often not have visibility of the physical address scheme used by the data processing apparatus itself. To avoid exposing the physical address while still enabling set aliasing performance effects to be identified, the trace steam may record the set indicator corresponding to an accessed physical address as part of the trace stream.

Note that although the trace stream indicates cycle-by-cycle behaviour of the processing circuitry, it is not necessary for the trace stream to include explicit information for every cycle. It is enough that the trace stream enables the cycle-by-cycle behaviour to be inferred. For example, recording the outcomes of branch instructions, exception events, or other events causing non-sequential changes of program flow may be enough to allow the trace analyser (which has a copy of the program which was executed) to identify which instructions were executed in each cycle, even if not every instruction is explicitly identified in the trace stream.

Hence, performance monitoring circuitry or trace circuitry could record set indicators in response to cache accesses observed during processing of the processing circuitry.

However, it is also possible for a set indicator corresponding to a given physical address to be recorded even if there is not currently a cache access being triggered for the corresponding physical address. For example, the set indicator could be generated in response to a set indicator generating instruction which identifies a target virtual address. In response to that instruction, the target virtual address may be translated to the target physical address (either using address translation hardware or in software), and then the target physical address may be mapped to a set indicator and be recorded by a set indicator recording circuitry. The set indicator could for example be recorded by writing it to a register. Such a register may be accessible to a software process to which the physical address is inaccessible. Hence, a "virtual address to set indicator" instruction can be used to allow software processes which would not normally be able to have visibility of the physical address to determine information for identifying which addresses map to the same set. This could be useful for assessing performance using software instrumentation for example.

The cache could be a direct-mapped cache, for which each set comprises a single storage location, or a set-associative cache for which each set comprises two or more storage locations.

A method of analysing monitoring data is also provided, comprising reading monitoring data including set indicators corresponding to respective physical addresses, and comparing the respective set indicators to identify whether the corresponding physical addresses mapped to the same set of the cache. This allows contention for the same set of the cache to be identified, helping diagnose possible reasons for loss of performance, without exposing physical addresses. The method can be performed by an analysis device or by software with a computer program comprising instructions to control a data processing apparatus to perform the method. The computer program may be stored on a storage medium. The storage medium may be a non-transitory medium.

FIG. 1 illustrates an example of a processing apparatus 2 having a processing pipeline 4 for performing data processing in response to instructions. The pipeline 4 comprises a number of pipeline stages including a fetch stage 6 for fetching instructions from an instruction cache 8, a decode stage 10 for decoding the fetched instructions, an issue stage 12 for queueing instructions while awaiting operands to become available and issuing instructions whose operands are available for execution, an execute stage 14 for executing the instructions to carry out data processing operations using operands store in registers 16, and a write back stage 18 for writing results of the executed instructions back to the registers 16. It will be appreciated that this is just one example of a possible pipeline architecture and other examples may have different combinations of stages. For example, in an out-of-order processor a rename stage may be provided between the decode stage and issue stage to rename architectural register specifiers identified by the decoded instructions to physical registers specifiers identifying the physical registers 16 provided in hardware. The execute stage 14 may include a number of execution units for executing different kinds of processing operations. For example, there may be an arithmetic/logic unit (ALU) for carrying out arithmetic or logical operations, a floating-point unit for processing floating-point instructions, a vector processing unit for executing vector processing instructions which act on operands comprising multiple data elements, or a load/store unit for executing load or store operations to transfer data between the register 16 and memory.

In this example, the memory system comprises the instruction cache 8, a level 1 data cache 20, as shared level 2 cache 22 and main memory 24. It will be appreciated that further levels of cache could be provided. Data stored in the memory system is identified by a physical address. In contrast, the instructions processed by the pipeline identify data using virtual addresses, which are translated into the physical addresses by a memory management unit (MMU) 26, which is an example of address translation circuitry. The MMU includes a translation lookaside buffer (TLB) 28 for storing address translation data for translating virtual address into physical address. When a virtual address is generated by the pipeline 4, it is issued to the MMU 26 which looks up whether the TLB 28 comprises a corresponding page table entry for the page corresponding to the required virtual address. If the required page table entry is present in the TLB 28, then the address can be translated relatively quickly in hardware and the corresponding physical address is returned to the execute stage 14, which may then trigger a data access to the memory system using the translated physical address. If the entry for the required virtual address is not present in the TLB 28, then the entry can be fetched from page tables stored in the memory system. In some MMUs there may be multiple levels of TLB in a hierarchical structure similar to the hierarchical structure of the caches 20, 22, so that a miss in a level 1 TLB triggers a lookup in the level 2 TLB, and a miss in the lowest level TLB triggers a page table walk to fetch the page table entry from memory.

Also, while for conciseness examples discussed below describe a single stage of address translation from a virtual address to a physical address, in some embodiments there may be two or more stages of address translation, for example a first stage to translate the virtual address to an intermediate physical address and a second stage to translate to the intermediate physical address to the physical address used by the memory system. Multiple stages of address translation can be useful for example to support virtualisation where a hypervisor manages multiple operating systems running under it and each of those operating systems manages a number of applications. The first stage of address translation may be controlled using page tables set by the operating system to translate the virtual addresses specified by the applications or the operating system itself to intermediate physical addresses, which from the operating system's point of view may appear to be physical addresses. However, a second stage of address translation based on page tables managed by the hypervisor may then translate the intermediate addresses to the physical addresses actually used by the memory system. This enables multiple operating systems to coexist on the same hardware platform even if their addresses conflict, since the hypervisor can remap the operating systems to use different portions of the physical address space.

In some systems, there may be a one-to-one mapping between the instructions received for decoding at the decode stage 10 and the instructions processed by later stages. However, in other examples, the "instructions" as seen by later stages 12, 14, 18 of the pipeline 10 may not be in the same form as the instructions fetched from the instruction cache 8 which are provided to the decode stage 10. The macro-instructions fetched may have an encoding according to a given instruction set architecture, but the decode stage 10 may map these instructions to micro-operations (p-ops) to be processed by the execute stage 14. For example, a load multiple instruction, which loads multiple register locations with different values, could be mapped to multiple p-ops, each for loading a register with a value, and each of these μ-ops may require a separate address translation. Similarly, there may be other complex instructions defined in the architecture which could be mapped to simpler pops by the decode stage 10. Also, the decode stage 10 may fuse two architectural instructions into one pop supported by the execute stage 14, e.g. a multiply instruction followed by an addition using the result of the multiply could be replaced with a multiply-add p-op if such an operation is supported by the execute stage 14. Hence, references to "instructions" may encompass p-ops.

The apparatus 2 has performance monitoring circuitry 30 for monitoring the processing performed by the pipeline 4 and recording performance monitoring data indicating information useful for analysing the performance of the pipeline 4. For example, the performance monitoring data may indicate events occurring during the processing, or include performance metrics measured during the processing performed. The performance monitoring circuitry 30 includes a performance buffer 32 for storing the recorded performance monitoring data, counters 34 for counting events or elapsed processing cycles for generating the performance metrics, and configuration registers 36 for storing control data for configuring the way in which the performance monitoring circuitry 30 tracks performance.

In some examples, the performance monitoring circuitry 30 may record how many events of a given type occur during processing of the program as a whole, without attributing events to particular instructions. For example, one of the counters 34 may be incremented each time there is a miss in the level 1 data cache 20, the level 2 cache 22 or the TLB 28 for example. This can provide some insight into the performance achieved because if there are a large number of cache or TLB misses then it can be assumed that performance may be worse than if there are fewer misses. Similarly, metrics such as the number of instructions processed in a given time could be recorded. The recorded metrics can be written to the performance buffer 32 temporarily. When the buffer 32 becomes full then an exception may be triggered to write the recorded performance data out to the memory system to free up space for recording further performance monitoring data. When processing of the program is finished or has reached a given point, a performance analysis tool can read out the recorded performance monitoring data from the memory system and analyse it to identify issues which may be causing poor performance, which can help software developers to identify how to adapt software to make it more efficient.

In addition, or instead of, recording performance monitoring data about the operation of the program as a whole, the performance monitoring circuitry may also record events or behaviour associated with particular instructions being processed by the pipeline 4. This can allow the cause of performance issues to be pinpointed more precisely. While some embodiments could record events associated with each instruction processed by the pipeline 4, this would generate a lot of performance monitoring data which may be expensive in terms of storage capacity. To cut down the profiling overhead to something more manageable, instruction sampling circuitry 40 may be provided to select particular instructions to be monitored. Although one might expect that recording performance monitoring data for only a subset of instructions could miss certain performance-critical events, sampling a certain fraction of the instructions can give enough information to provide a statistically representative view of the performance of the program as a whole, and makes it more feasible to record information attributed to a particular point in the program.

In this example the instructions are sampled at the decode stage 10, but the sampling could also take place elsewhere in the pipeline. The instruction sampling circuitry 40 may tag certain instructions as instructions to be monitored, either by setting a flag which passes down the pipeline with the selected instruction, or by recording identifiers of the selected instructions in a storage location accessible to the performance monitoring circuitry 30. For example, instructions may be sampled periodically at intervals, which may be measured in terms of time, number of elapsed processing cycles, decoded instructions or decoded micro-operations for example. The instruction sampling circuitry 40 may have a counter which is incremented or decremented in response to each cycle, instruction or micro-operation, and counts either upwards towards a given threshold or down from an initial value towards zero. When the counter reaches the threshold/zero then the next instruction is tagged, and then the counter reset to resume counting for another sampling period. Optionally, in some embodiments on expiry of the counter, rather than selecting the next instruction as the tagged instruction, the instruction sampling circuitry 40 could count on for a random number of cycle, instructions or micro-operations before tagging the next instruction. Adding some random perturbation to the sample selection can improve the statistical validity of the selected sample population, since it reduces the risk that the same instruction is repeatedly selected as a tagged sampling when the sampling period coincides with a repeated loop in the program being monitored. The length of the sampling period (defined by the threshold or the initial value to which the counter is reset) may be defined in the configuration registers 36.

The performance monitoring circuitry 30 detects whether instructions processed by the pipeline are tagged instructions, and when a tagged instruction is detected then the performance monitoring circuitry 30 captures some performance monitoring data about the processing of that instruction. Examples of performance monitoring data which could be collected for a sampled instruction include:

Timestamps relating to the sampled instruction (e.g. indicating the time at which the instruction was encountered);

The context, privilege level and security state from which the instruction was issued;

Whether the instruction generated an exception;

Whether the instruction completed execution;

The program counter virtual address for the instruction;

Whether the instruction is a branch, a load, a store, or other type of instruction;

Whether the instruction is a conditional or unconditional instruction;

The total latency, that is a cycle count from the instruction being dispatched for issue to the instruction being complete;

The issue latency, that is a cycle count from the instruction being dispatched to the issue queue 12 to being issued to the execute stage 14.

For load, store or atomic instructions, the buffer 510 may also record:

The virtual address being accessed.

A set indicator as discussed below (or in some modes, the physical address being accessed)

The instruction type (load, store or atomic).

Whether a request for translation data hit in a TLB.

Whether the data access hit in a first level cache.

Whether the data access hit in any other level caches.

An indicator of the data source for a load.

The configuration registers 36 may specify what particular information is to be recorded through the sampled instructions. For example, not all of the information listed above may be of interest and to save space in the buffer 32 it may be more efficient to omit certain pieces information. A packetized format may be used to write the recorded performance monitoring information to the buffer 32. The configuration registers 36 could also specify whether the performance monitoring is enabled at all, or set parameters such as the sampling interval at which the sampling circuitry is to select the next sampled instruction, a memory address of a region in the memory system where performance monitoring data is to be written when the buffer becomes full, and so on. The configuration registers 36 could be set at least partially by the code for performing analysis of the recorded performance monitoring data. On the other hand, as discussed below, some parameters of the configuration register 36 could be set by more privileged code to control what aspects of the operation of the pipeline 4 may be visible to the performance analysis tool, which may be relatively insecure. For example, it may not be desirable to expose physical addresses to the performance analysis tool and so this could be disabled by an operating system or hypervisor or other privileged code aware of the physical addresses.

One factor influencing performance is the contention of individual data items for individual sets in a set-associative or direct-mapped cache. FIG. 2 shows an example of a set associative cache which could be used for the L1 or L2 data cache 20, 22 for example. The cache includes a number of storage locations 50 for storing data from memory 24. The storage locations 50 are divided into a number of sets 52 which in a set-associative cache comprise at least two storage locations 50. For example FIG. 2 shows an example of a 4-way set-associative cache, which means that each set 52 includes 4 storage locations 50. Each memory address corresponds to one particular set 52 in the cache and the data item associated with that address can only be placed in one of the storage locations 50 of the associated set. Which set 52 is selected for a given address is determined as a function of certain index bits of the address. In some caches using a linear indexing scheme the index bits may explicitly identify the set while in non-linear indexing schemes an arbitrary hashing function may be applied to the index bits to identify the corresponding set.

In this example the cache is physically indexed, which means that the set 52 to access is identified based on index bits of the physical address translated by the MMU 26, rather than the virtual address. The physical address includes a tag portion 60, an index portion 62, and a block offset portion 64. The index portion 62 is used to identify the corresponding set 52. When a data item is stored to one of the storage locations 50 of the corresponding set 52, the tag portion 60 of the address of the data item is written alongside the data in the storage location 50 as a tag value 54. This allows data associated with different addresses which share the same index portion 62 to be distinguished. When searching the cache for a given address, the index bits 62 of the target address index into to the required set 52 and then the tags 54 of each storage location (way) of that set are compared with the tag 60 of the target address to identify whether any of those ways store the required data. If the tag 54 for a given way matches the tag portion 62 of the target address, then there is a cache hit. If the cache access is a load (read), the corresponding data value is returned from the matching way. If the cache access is a store (write), the data value in the matching way is updated based on the write data provided with the cache access request. On the other hand, if none of the ways contain a tag 54 matching the tag portion 62 of the target address, there is a cache miss and the required data for a load may be fetched from another cache or memory, or for a store the write data is allocated into the cache. The block offset portion 64 of the physical address identifies the position of the required data item within a cache line stored in a particular storage location 50. For example, the block offset portion 64 may indicate which byte of the cache line is required.

While FIG. 2 shows an example of a four-way set associative cache, other examples may have different associativity (number of ways per set). Also, in some examples the cache 20 could be a direct-mapped cache, which is essentially a one-way set-associative cache where each set 52 comprises only a single storage location 50.

Hence, a set associative or direct mapped cache limits the storage locations 50 which can be used to store a given data item, depending on that item's address. This means that if all the storage locations in a set are already storing other data items, then caching a further item whose address maps to the same set would require an existing data item to be evicted. If the evicted data item is later accessed again then it may require eviction of another data item in that set, and so if there are continued accesses to a greater number of data items than there are ways in one set 52, the frequent eviction and line fetches may affect performance. For a physically-indexed cache, helping program developers to identify when contention for a given set is causing performance issues would require knowledge of which set each data item corresponds to, which may not be possible from the virtual address alone.

As shown in FIG. 2, with a physical indexed cache, the set is determined by the index portion 62 of the physical address. While some bits of the index portion 62 may be identical to the corresponding bits of the virtual address, other index bits may not be inferred from the virtual address. Address translation is typically managed at a granularity of blocks of addresses called pages. The virtual address may include a page address portion 70 and a page offset portion 72. The virtual addresses in the same page have the same page address portion 70 and share one address translation entry in the page tables, which specifies how to map the page address portion 70 of the virtual address to a corresponding portion of the physical address. On the other hand, the page offset portion 72 identifies the offset of the desired address relative to the start of the page, and remains unchanged during the address translation. If the cache was sufficiently small that the index portion 62 is entirely within the page offset portion of the physical address, then the virtual address could be enough to identify the set. However, in practice caches are often large enough that some index bits of the physical address correspond to the page address portion 70 and so cannot be inferred from the virtual address. Hence, sampling the virtual address alone may be insufficient to explain the real performance affects visible to application developers caused by contention for the locations within a given set 52.

Sampling the physical address may be a way to help application developers understand when their data is aliasing in a physically indexed cache. Hence, the performance monitoring circuitry 30 could (in some modes) record the physical address associated with a given sampled data access. When analysing the performance monitoring data, if a number of sampled instructions have physical addresses which map to the same set, it can be inferred that contention for the same set could be a possible reason for loss of performance. However, often it may be undesirable to expose the physical addresses to the performance analysis tool or any other software which has access to the performance data. For example, an operating system may be unwilling to expose physical addresses to the application level, as this could increase vulnerability to attacks which exploit knowledge of the physical layout of memory.

To avoid exposing the full physical address, the performance monitoring circuitry 30 may have a mode in which instead of sampling the physical address for a given instruction, a set indicator is sampled which depends on which of the sets 52 corresponds to a given target physical address, but is insufficient to identify the target physical address itself. The set indicator could simply be the index portion 62 of the physical address itself, or at least those bits of the index portion which cannot already be inferred from the virtual address (if the virtual address is already being recorded in the performance monitoring data). However, in some cases the index bits themselves may still provide some clue as to the layout of data in physical memory, and so a further obfuscating function can be applied to the index to make it harder to infer the actual physical address bits used for the index. The obfuscation can be keyed by secrets known only to a physical address-aware layer such as an operating system or hypervisor. For example the index can be XORed with a constant. Any indicator function f(PA) is suitable if it has the property that f(a1)=(a2) if addresses a1 and a2 are in the same set for the cache level of interest.

Figure 3:
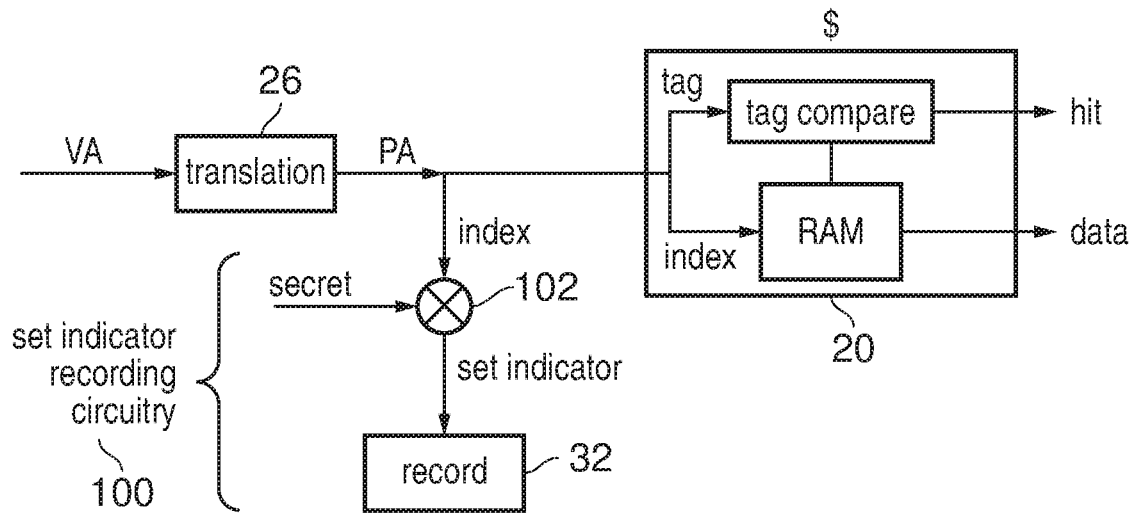
FIG. 3 shows a first example of set indicator recording circuitry.

FIG. 3 shows one way of generating the set indicator. The performance monitoring circuitry may include set indicator recording circuitry 100 which samples at least some of the index bits of the physical address generated by the MMU 26, subjects the index bits to an obfuscating function 102 based on a secret key, and records the result in the performance buffer 32 as the set indicator for the current access. The set indicator may be recorded in association with the virtual address of the data access, as well as any other data sampled for that access. Meanwhile the physical address may be issued to the cache 20 to load data from the cache or store data to the cache. This approach works with relatively simple linear cache indexing schemes to sample the physical address at the point of the data access before it reaches the cache and sample sufficient bits of the physical address to determine index matches in the caches of interest. In some cases all the index bits could be subjected to the obfuscated function 102, while in other cases only the index bits which cannot be inferred from the virtual address could be sampled. In some cases the obfuscating function 102 could be applied to a portion of the physical address which also includes some non-index bits. The obfuscating function 102 could be any opaque bijective or injective function, such as XOR, an S-box function, avalanche function, or mixing function, for example.

Figure 4:
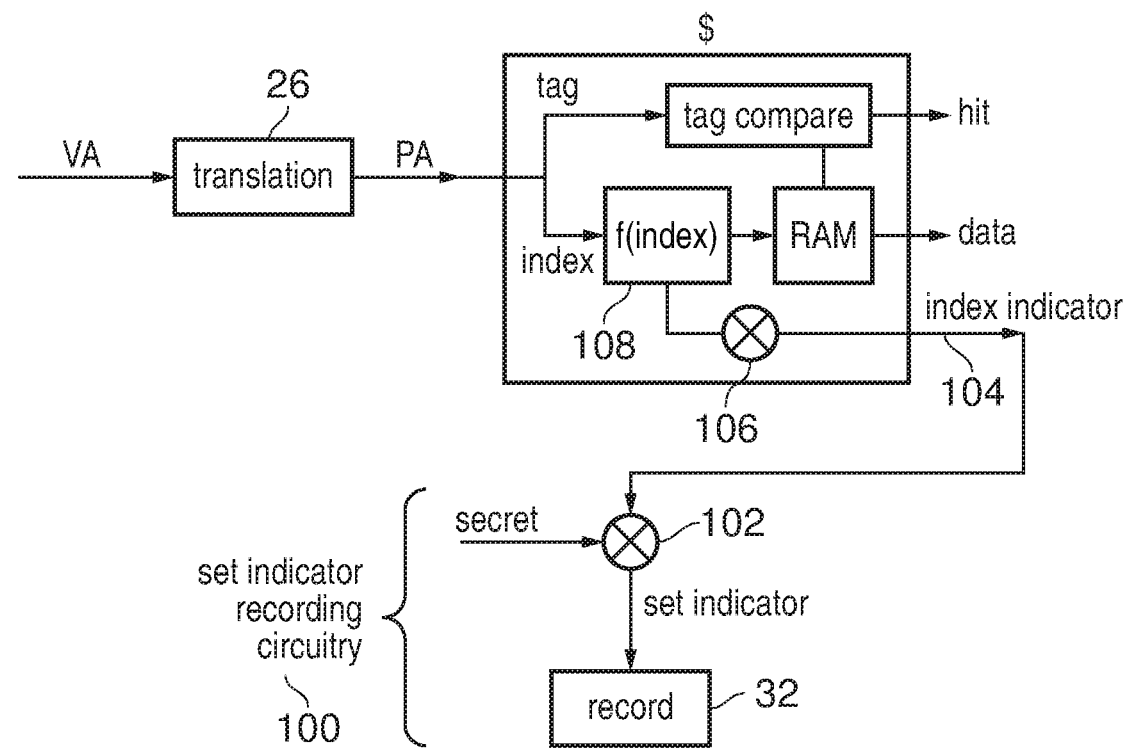
FIG. 4 shows a second example of set indicator recording circuitry.

FIG. 4 shows an alternative technique for generating the set indicator using the set indicator recording circuitry 100. In this example the physical address generated by the address translation may be issued to the cache and the cache may use it to identify whether the required data is stored in the cache and return or update the cached data as appropriate for a load or store. The cache also returns an index indicator 104 (e.g. as side band data alongside the load data itself), which identifies which set 52 corresponds to the target physical address. The returned index indicator 104 may be subject to the obfuscating function 102 within the set indicator recording circuitry 100 to generate the set indicator which is recorded within the performance record for the current data access. Alternatively, the index indicator 104 could be recorded unchanged as the set indicator. The cache could also apply some obfuscation 106, although this is optional. This implementation supports more arbitrarily complex cache indexing schemes where the cache identifies the set by hashing arbitrary numbers of physical address bits using a hash function 108.

Regardless of which approach is used, the generated set indicator can be recorded in the performance buffer as part of the record for the instruction triggering the cache access. Set indicators can be recorded for any type of instruction which triggers an access to the cache, including not only load or store instructions, but also cache maintenance instructions for invalidating or cleaning data in the cache associated with a given address. Set indicators could also be recorded for other events causing a cache access (not triggered by an instruction), e.g. data prefetching based on a hardware prediction mechanism for predicting which addresses will later be required by the instructions processed by the pipeline.

Figure 5:
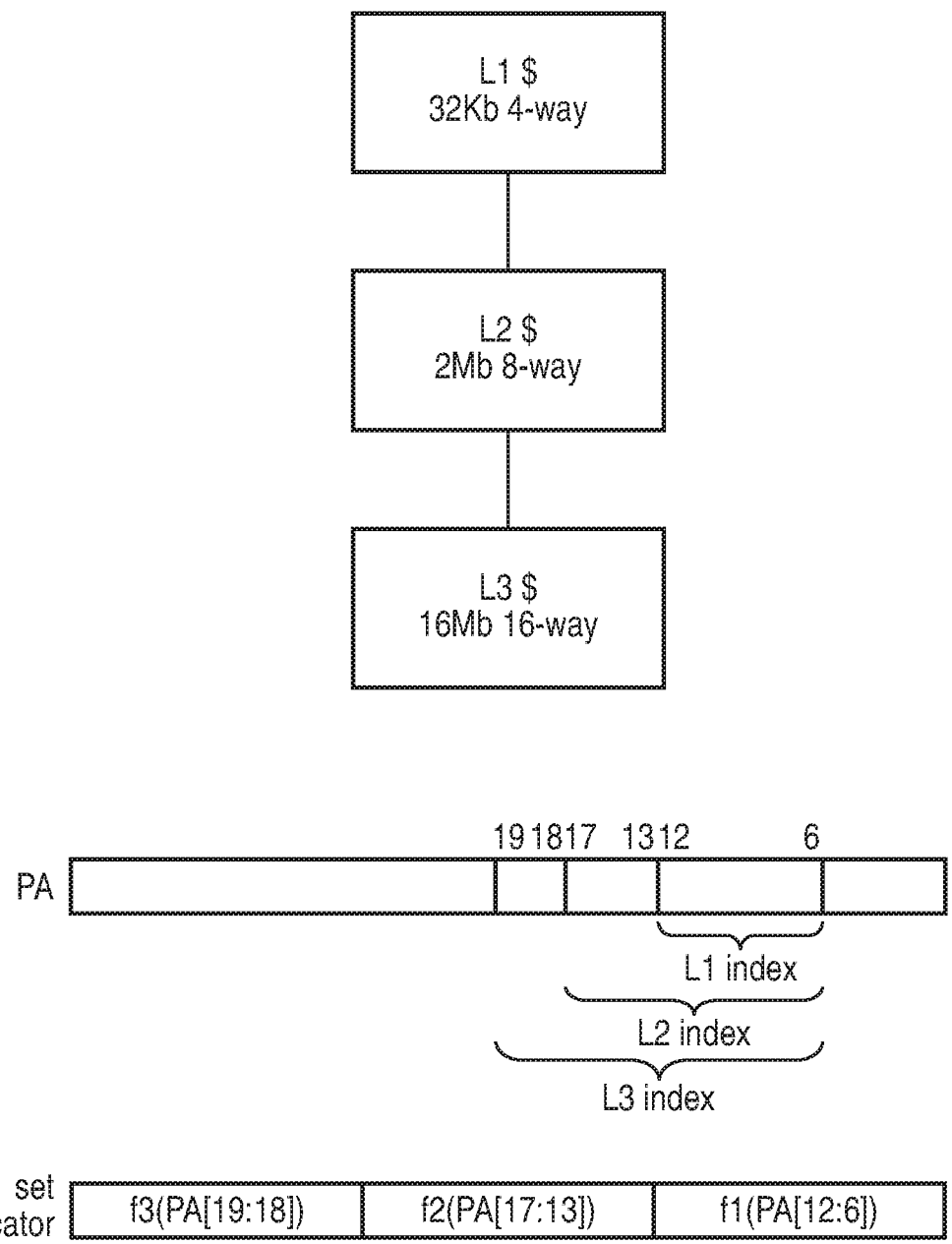
FIG. 5 shows an example of recording a set indicator providing information for identifying the set corresponding to the physical address in multiple cache levels.

As shown in FIG. 5, the system may include a number of cache levels with different layouts, sizes and associativity. For example, FIG. 5 shows an example where a 32 Kb level 1 cache is 4-way set associative and is indexed by physical address bits [12:6], a 2 Mb 8-way level 2 cache is indexed by physical address bits [17:6] and a 16 Mb level 3 cache is 16-way set-associative and indexed by physical address bits [19:6]. In this case, the performance monitoring circuitry 30 could record separate set indicators for each level of the cache, or record a single set indicator which includes information for identifying which set corresponds to a given physical address in each of the levels of cache of interest.

For example, with the approach shown in FIG. 3 the set indicator recording circuitry may sample sufficient bits of the physical address to determine set matches in each of the caches of interest e.g. it may depend on bits 19 to 6 covering the index portions used for each of the three cache levels.

The number of bits to sample may be configured by a physical-address-aware software process. An application developer aware of the cache geometry can then look at the relevant bits of the set indicator to determine whether addresses are conflicting in a given cache level. In this case any obfuscation applied may ensure that the relevant bits corresponding to each cache level are separately recoverable.

For example, the set indicator can be configured as shown at the bottom part of FIG. 5 so that it is obtained by concatenating the results of respective functions f1, f2, f3 applied to bits [12:6], [17:13] and [19:18] respectively. The functions f1, f2, f3 could be different functions or the same function, and at least one of the functions f1, f2, f3 could be the identity function which leaves the corresponding address bits the same. By providing a set indicator which has a number of portions each mapped from non-overlapping sets of index bits used for indexing a given level of the cache, this enables separate identification of whether the corresponding addresses map to the same set in each of the levels of the cache. Hence, if set indicators are generated for two data accesses, then if the portions corresponding to function f1([12:6]) are the same, this indicates set contention in the level 1 cache, if the portions corresponding to functions f1([12:6]) and f2([17:13]) are the same for both accesses, then this indicates set contention in the level 2 cache, and if all the bits of the set indicator are the same for both set indicators then this indicates set indication in the level 3 cache. In the example of FIG. 5, to reduce the size of the set indicator, the functions f2 and f3 are applied to the bits of the level 2 and level 3 index portions which cannot already be inferred from the bits subjected to the earlier functions f1, f2. However, it would also be possible to form a set indicator where each portion corresponds to the entire index portion of the corresponding level of cache.

While FIG. 5 shows an example with 3 levels of cache, it will be appreciated that other cache hierarchies could have different numbers of cache level. In general, when there are at least two cache levels, the set indicator may include at least a first portion depending on at least one index bit of the target physical address for selecting which the corresponding set in the level 1 cache, and a second portion depending on at least one index bit of the target physical address for selecting the corresponding set in the level 2 cache. If the index portion used for the level 2 cache overlaps with the index portion used for the level 1 cache, then the second portion may be formed from the bits of the level 2 index portion which are not used for indexing into the level 1 cache.

Aside from performance monitoring, there are also other contexts in which recording a set indicator can be useful. As shown in FIG. 6, a data processing apparatus 2 having processing circuitry 4, a physically-indexed cache 20 and memory 24 may be provided with a trace module 120 for monitoring the activity of the processing circuitry 4 and capturing trace data which is indicative of cycle-by-cycle activity of the processor. Although not indicated in detail for conciseness, the processing circuitry 4 may be similar to the pipeline shown in FIG. 1. To allow a software developer to identify the exact path which was taken through a given program for a particular execution run, the trace module 120 may generate trace data which enables the cycle-by-cycle program flow to be reconstructed, for example recording the outcomes of branch instructions so that the instructions executed in each cycle can be determined based on the branch outcomes. The trace module 120 may also record other types of information such as the data addresses accessed in the cache 20 or memory 24, exception events which occurred, etc. The trace stream generated by the trace module 120 may be output to a trace buffer 122 and stored locally on chip or output to an external device via a trace interface 124. While FIG. 6 shows an example including both a trace buffer 122 and a trace interface 124, in other examples only one or other could be provided. The trace data can be output to an analysing apparatus 150, which may for example be a general purpose computer executing analysis software for interpreting the trace stream to reconstruct the cycle-by-cycle activity of the processing circuitry 4. For example, the analysing apparatus may have a memory 152 storing the trace analysis software. The memory 152 may also store a copy of the target program which was executed by the processing circuitry 4. A processor 156 controlled by the analysis software parses the trace stream with reference to the stored copy of the target program to identify what events took place in each cycle of execution of the target program by the data processing apparatus 2.

As part of the trace data captured by the trace module 120, the trace module 120 can record a set indicator corresponding to the physical address of a cache access using any of the techniques discussed above, to provide information about which set of the cache 20 was accessed, without exposing the physical address itself. This provides information which can be useful for analysing real time performance effects in a cached real time processor core. Hence, the trace module 120 may include set indicator recording circuitry 100 as discussed above and can generate the set indicator in any of the ways described.

Also, while the performance monitoring circuitry or trace module 120 may generate the set indicator when there is a data access to the cache, it is also possible to generate the set indicator independently of any data access, corresponding to an arbitrarily selected target address. For example, as shown in FIG. 7, the processing circuitry 4 may support a set indicator generating instruction which specifies a destination register Rd and a target virtual address Va. As shown in FIG. 7, the target virtual address Va could be defined in various ways, such as using a base register Rb and offset register Roff, or a base register Rb and immediate value # imm. In response to the set indicator generating instruction, the processing circuitry 4 may trigger the virtual address to be translated to a physical address by the MMU 26 and then the physical address mapped to a set indicator, e.g. by sampling a subset of index bits and applying an obfuscating function. The obtained set indicator can be recorded by writing it to one of the registers 16, from which it can be accessible to code executed by the processing circuitry which may not itself have access to the physical address. In this way, the set indicator instruction can be exposed to exception levels where the physical address (or instructions for translating virtual addresses to physical addresses) would not be exposed. This can be useful for software instrumentation, so that a program can be annotated with additional instructions to obtain diagnostic information (including the set indicator) for analysing performance. For example, if there are going to be a series of data accesses to a number of virtual addresses, the virtual addresses could be tested to determine whether they map to the same set of the cache by executing set identifier generating instructions specifying those virtual addresses.

Hence, a processing apparatus may have set indicator recording circuitry for recording a set indicator corresponding to a target physical address (which could be the target physical address associated with a cache access or an arbitrarily selected address identified by translating a corresponding virtual address). The set indicator in general depends on which set in the cache maps to the target physical address, but is insufficient to identify the target physical address itself. The set indicator could be recorded in a number of ways, such as by writing it to a buffer, outputting it in a trace stream or writing it to a register. The cache for which the set indicator is generated could be set associative or direct mapped.

Figure 8:
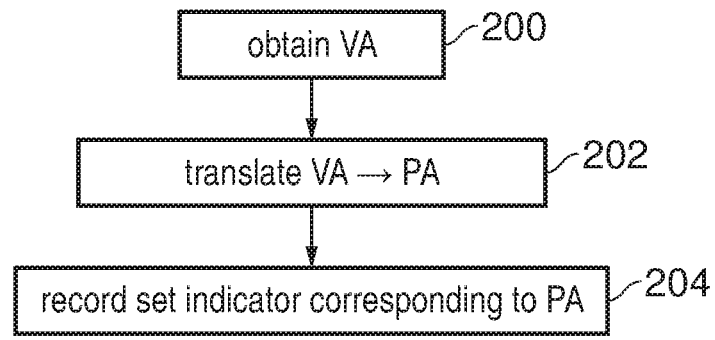
FIG. 8 shows a method of recording a set indicator.

FIG. 8 shows a method of recording a set indicator. At step 200 a virtual address is obtained, e.g. by reading it from a register or generating it by an arithmetic operation (e.g. adding an offset to a base address). At step 202 the virtual address is translated into a physical address, either in hardware by the MMU 26 or in software using instructions executed by the processing circuitry 4. At step 204 a set indicator corresponding to the translated physical address is obtained and recorded by writing it to a given storage location or outputting it over an interface. The method of FIG. 8 can then be performed a number of times for different virtual addresses to identify a corresponding series of set indicators which can then be compared later.

Figure 9:
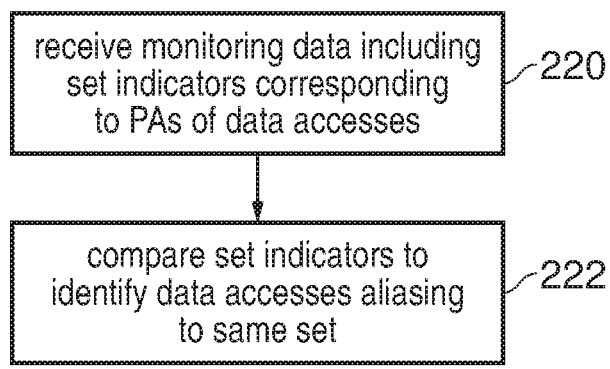
FIG. 9 shows a method of comparing set indicators to identify data accesses aliasing to the same set of the cache.

FIG. 9 shows a method of analysing monitoring data including the recorded set indicators. At step 220 the monitoring data is received, e.g. by performance analysis software or by a trace analysing apparatus 150. The monitoring data includes a series of set indicators corresponding to the physical addresses of a number of cache data accesses. At step 222 the respective set indicators are compared to identify which data accesses alias to the same set of the cache. When two set indicators match, this indicates that the corresponding data accesses map to the same set, and this can be a possible reason for any slow performance indicated by associated data within the monitoring data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry configured to access data in a cache indexed by a physical address translated from a virtual address; and
set indicator recording circuitry configured to record a set indicator corresponding to a target physical address, wherein the set indicator is dependent on which of a plurality of sets of one or more storage locations of the cache corresponds to the target physical address, and the set indicator is insufficient to identify the target physical address;
wherein the set indicator recording circuitry is configured to make the set indicator accessible to an external device to which the target physical address is inaccessible or software process to which the target physical address is inaccessible.

2. The apparatus according to claim 1, wherein the set indicator is dependent on at least one index bit of the target physical address for selecting which of the plurality of sets corresponds to the target physical address.

3. The apparatus according to claim 2, wherein the target physical address comprises a page portion translated from a corresponding portion of a target virtual address, and an offset portion mapped directly from a corresponding portion of the target virtual address; and
the at least one index bit is within the page portion of the target physical address.

4. The apparatus according to claim 3, wherein the set indicator recording circuitry is configured to record the set indicator in association with the target virtual address.

5. The apparatus according to claim 1, comprising address translation circuitry to translate virtual addresses identified by instructions processed by the processing circuitry to physical addresses for accessing data in the cache.

6. The apparatus according to claim 1, wherein the set indicator comprises a result of applying an obfuscation function to a subset of bits of the target physical address.

7. The apparatus according to claim 6, wherein the obfuscation function is dependent on a secret key accessible to the set indicator recording circuitry but inaccessible to an external device or software process to which the target physical address is inaccessible.

8. The apparatus according to claim 1, wherein the processing circuitry is configured to access data in a first level cache and a second level cache, wherein both the first level cache and the second level cache are physically-indexed; and
a first portion of the set indicator is dependent on at least one index bit of the target physical address for selecting which set of one or more storage locations of the first level cache corresponds to the target physical address, and a second portion of the set indicator is dependent on at least one index bit of the target physical address for selecting which set of one or more storage locations of the second level cache corresponds to the target physical address.

9. The apparatus according to claim 1, wherein the set indicator recording circuitry is configured to record the set indicator in response to the processing circuitry triggering a cache access corresponding to the target physical address.

10. The apparatus according to claim 9, wherein in response to the cache access, the set indicator recording circuitry is configured to sample a subset of bits of the target physical address provided to the cache, and to generate the set indicator based on the sampled subset of bits.

11. The apparatus according to claim 9, wherein in response to the cache access, the set indicator recording circuitry is configured to receive an index indicator from the cache indicating which of said plurality of sets corresponds to the target physical address, and to record a value dependent on said index indicator as said set indicator.

12. The apparatus according to claim 1, wherein the set indicator recording circuitry comprises performance monitoring circuitry configured to capture performance monitoring data indicative of performance of the processing circuitry when processing instructions;
wherein in response to an instruction triggering a cache access, the performance monitoring circuitry is configured to record in the performance monitoring data the set indicator corresponding to the target physical address of the cache access.

13. The apparatus according to claim 12, comprising instruction sampling circuitry to select a subset of instructions executed by the processing circuitry for performance monitoring, wherein the performance monitoring circuitry is configured to record the set indicator when one of the subset of instructions triggers a cache access.

14. The apparatus according to claim 12, wherein the performance monitoring circuitry is configured to write the performance monitoring data to a buffer or a memory region which is accessible to a software process to which the target physical address is inaccessible.

15. The apparatus according to claim 1, wherein the set indicator recording circuitry comprises trace circuitry to generate a trace stream indicative of cycle-by-cycle behaviour of the processing circuitry;
wherein in response to at least one instruction triggering a cache access corresponding to the target physical address, the trace circuitry is configured to record the set indicator in the trace stream.

16. The apparatus according to claim 15, wherein the trace circuitry is configured to output the trace stream to at least one of a trace buffer and a trace output interface from which the trace stream is accessible to an external device.

17. The apparatus according to claim 1, wherein in response to a set indicator generating instruction identifying a target virtual address, the set indicator recording circuitry is configured to generate the set indicator corresponding to the target physical address translated from the target virtual address.

18. The apparatus according to claim 17, wherein in response to the set indicator generating instruction, the set indicator recording circuitry is configured to write the set indicator to a register accessible to a software process to which the target physical address is inaccessible.

19. The apparatus according to claim 1, comprising the cache.

20. A data processing method comprising:
translating virtual addresses identified by processed instructions to physical addresses for accessing data in a physically-indexed cache;
recording a set indicator corresponding to a target physical address, wherein the set indicator is dependent on which of a plurality of sets of one or more storage locations of the cache corresponds to the target physical address, and the set indicator is insufficient to identify the target physical address; and
making the set indicator accessible to an external device to which the target physical address is inaccessible or software process to which the target physical address is inaccessible.

21. A method comprising:
reading monitoring data captured during processing performed by processing circuitry configured to access data in a cache indexed by a physical address translated from a virtual address, the monitoring data comprising a plurality of set indicators corresponding to respective physical addresses, wherein each set indicator is dependent on which of a plurality of sets of one or more storage locations of the cache corresponds to the corresponding physical address, and is insufficient to identify the corresponding physical address, wherein the reading is performed by an external device to which the target physical address is inaccessible or software process to which the target physical address is inaccessible; and
comparing respective set indicators to identify whether the corresponding physical addresses map to the same set of the cache.

22. A non-transitory, computer readable storage medium storing a computer program comprising instructions to control a data processing apparatus to perform the method of claim 21.

* * * * *